US010557429B2

United States Patent
Hoshino (10) Patent No.: US 10,557,429 B2
(45) Date of Patent: Feb. 11, 2020

(54) ENGINE CONTROL APPARATUS

(71) Applicant: DENSO CORPORATION, Kariya, Aichi-pref. (JP)

(72) Inventor: Shogo Hoshino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/301,250

(22) PCT Filed: Apr. 27, 2017

(86) PCT No.: PCT/JP2017/016760
§ 371 (c)(1),
(2) Date: Nov. 13, 2018

(87) PCT Pub. No.: WO2017/195628
PCT Pub. Date: Nov. 16, 2017

(65) Prior Publication Data
US 2019/0178182 A1    Jun. 13, 2019

(30) Foreign Application Priority Data
May 10, 2016   (JP) .................. 2016-094756

(51) Int. Cl.
*F02D 41/04*    (2006.01)
(52) U.S. Cl.
CPC ................. *F02D 41/042* (2013.01)
(58) Field of Classification Search
CPC ...... F02D 41/062; F02D 41/26; F02D 41/009; F02D 41/04
See application file for complete search history.

(56) References Cited

U.S. PATENT DOCUMENTS

| 7,878,173 B2 * | 2/2011 | Kishibata | ............... B63H 21/14 123/319 |
| 2008/0105230 A1 * | 5/2008 | Kishibata | .............. F02D 41/062 123/179.5 |
| 2009/0030595 A1 * | 1/2009 | Sugai | ..................... B60K 6/445 701/112 |

(Continued)

FOREIGN PATENT DOCUMENTS

| EP | 1403511 A1 | 3/2004 |
| EP | 1403512 A1 | 3/2004 |

(Continued)

OTHER PUBLICATIONS

Jul. 25, 2017 International Search Report issued in International Patent Application No. PCT/JP2017/016760.

*Primary Examiner* — Long T Tran
(74) *Attorney, Agent, or Firm* — Oliff PLC (57) ABSTRACT

An engine control apparatus determines that a piston is at a compression top dead center immediately before engine speed of an engine becomes zero if of the engine speed at the compression top dead center of the engine in a rotation drop period while the engine speed drops to zero after combustion of the engine is stopped. In the case where it is determined that the piston is at the compression top dead center immediately before the engine speed of the engine becomes zero, the engine control apparatus applies counter torque by the rotating electrical machine from the compression top dead center to stop the piston at a rotation angle position in a first half period of expansion process by application of the counter torque.

7 Claims, 7 Drawing Sheets

(56) References Cited

U.S. PATENT DOCUMENTS

| | | | |
|---|---|---|---|
| 2015/0059688 A1* | 3/2015 | Kojima | F02D 37/02 123/305 |
| 2016/0003207 A1* | 1/2016 | Kojima | B60K 6/48 477/5 |

FOREIGN PATENT DOCUMENTS

| | | |
|---|---|---|
| EP | 1591657 A2 | 11/2005 |
| JP | 2009-173164 A | 8/2009 |
| JP | 2012-102620 A | 5/2012 |

* cited by examiner

ENGINE CONTROL APPARATUS

CROSS-REFERENCE TO RELATED APPLICATION

This application is the U.S. national phase of International Application No. PCT/JP2017/016760 filed Apr. 27, 2017 which designated the U.S. and claims priority to Japanese Patent Application No. 2016-94756 filed May 10, 2016, the contents of which are incorporated herein by reference.

TECHNICAL FIELD

The present disclosure relates to an engine control apparatus.

BACKGROUND ART

In a vehicle, when an engine is stopped, there is a case where vibration may occur by swing-back (inverse rotation) of rotation of the engine, and the vibration may provide a feeling of discomfort to a driver. This occurs by a piston being pushed back by a pressure within a cylinder when rotation of an engine output shaft is stopped.

For example, in a technique disclosed in PTL 1, in a vehicle having an idling stop function, swing-back occurring when rotation of an engine output shaft is stopped is predicted. Then, in the case where it is determined that swing-back will occur, control is performed so that a piston gets over a top dead center by applying torque on a positive rotation side to the engine output shaft using a starter motor. By this means, occurrence of swing-back is suppressed.

CITATION LIST

Patent Literature

[PTL 1] JP 2012-102620 A

SUMMARY OF THE INVENTION

However, in the case where control is performed so that the piston gets over the top dead center, it is not clear whether the piston is actually stopped at an appropriate position. As a result, there is a possibility that swing-back may occur again.

The present disclosure is mainly directed to providing an engine control apparatus which is capable of suppressing vibration in association with inverse rotation of an engine by suppressing occurrence of the inverse rotation of the engine.

A first disclosure is an engine control apparatus which is applied to an engine system including rotating electrical machine which is capable of applying positive torque which is torque on a positive rotation side and counter torque which is torque on an inverse rotation side to an engine output shaft of an engine in which a cycle including each process of compression and expansion is repeatedly performed, the engine control apparatus including a rotation speed determining unit configured to determine that a piston is at a compression top dead center immediately before engine speed becomes zero if engine speed at the compression top dead center of the engine during a rotation drop period while the engine speed drops to zero after combustion of the engine is stopped, and a torque control unit configured to, in the case where it is determined that the piston is at the compression top dead center immediately before the engine speed becomes zero, apply counter torque by the rotating electrical machine from the compression top dead center to stop the piston at a rotation angle position in a first half period of expansion process by application of the counter torque.

In the case where the piston is stopped in a second half of the expansion process when the engine speed becomes zero, the piston may be pushed back by compression reactive force within a cylinder. In such a case, the engine inversely rotates, and, as a result, vibration occurs.

With the above-described configuration, in the case where it is determined that the piston is at the compression top dead center immediately before the engine speed becomes zero, counter torque is applied from the compression top dead center using the rotating electrical machine. In this case, by applying the counter torque, it is possible to stop the piston at a position in the first half of the expansion process. By this means, it is possible to suppress occurrence of inverse rotation of the engine and suppress vibration in association with the inverse rotation of the engine. Note that, in a multi-cylinder engine, it is preferable that stop positions of pistons are controlled by application of counter torque so that a stop position of a piston in one cylinder is located in the first half period of the expansion process and stop positions of pistons in other cylinders are not located in the second half period of the compression process.

In a second disclosure, the rotation speed determining unit determines that the piston is at the compression top dead center immediately before the engine speed becomes zero if the engine speed at the compression top dead center of the engine is equal to or less than a predetermined value, and the predetermined value is a value with which it is determined that rotation of the engine output shaft is stopped until the first half period of the expansion process elapses by application of the counter torque by the rotating electrical machine from the compression top dead center.

With the above-described configuration, because the predetermined value is a value with which it is determined that the piston is stopped at a position in the first half of the expansion process by application of the counter torque, it is possible to stop the piston at a desired position. By this means, it is possible to suppress vibration in association with inverse rotation of the engine by suppressing occurrence of the inverse rotation of the engine.

A third disclosure is the engine control apparatus including a stop determining unit configured to determine whether the piston is stopped at the rotation angle position in the first half period of the expansion process after the counter torque is applied by the rotating electrical machine, the torque control unit stopping application of the counter torque on the basis that it is determined that the piston is stopped at the rotation angle position in the first half period of the expansion process after application of the counter torque. In the case where it is determined by the stop determining unit that the piston is not stopped at the rotation angle position in the first half period of the expansion process, the torque control unit applies positive torque by the rotating electrical machine so that the piston gets over the next compression top dead center.

With the above-described configuration, the stop determining unit is provided, and, in the case where it is determined that the piston is stopped at a desired position after the counter torque is applied, the counter torque is stopped. In this case, when rotation of the engine is stopped at a position in the first half of the expansion process, application of the counter torque is cancelled. By this means, it is possible to prevent inverse rotation of the engine due to application of the counter torque. In the case where it is determined at the stop determining unit that the piston is not stopped at the desired position, backup processing of performing processing again is provided. That is, in the case where it is determined that the piston is not stopped at the desired position, positive torque is applied so that the piston gets over the next compression top dead center. Then, when the compression top dead center is reached, processing of stopping the piston at a position in the first half of the expansion process by applying counter torque again from the compression top dead center is performed. By this means, it is possible to stop the piston at a desired position more reliably, so that a vibration suppression effect is improved.

Here, application of the positive torque is not performed every time the engine is stopped, and is performed only in the case where stop of rotation by the last application of counter torque has failed, that is, in the case where the piston cannot be stopped in the first half of the expansion process. It is therefore possible to minimize increase of power consumption caused by application of positive torque.

A fourth disclosure is the engine control apparatus including a resonance range determining unit configured to determine that the engine speed is within a predetermined rotation speed range including at least a resonance range of the engine in the rotation drop period, the torque control unit applying counter torque by the rotating electrical machine in the case where it is determined that the engine speed is within the predetermined rotation speed range prior to application of the counter torque.

With the above-described configuration, in addition to application of counter torque in crank angle stop processing, a configuration of applying counter torque in the predetermined rotation speed range including the resonance range is further provided. In this case, it is possible to suppress vibration in association with the resonance range in addition to vibration in association with inverse rotation of the engine. By this means, it is possible to reduce the negative effect of vibration in association with the resonance range on vibration in association with inverse rotation, so that it is possible to provide a synergistic vibration suppression effect.

BRIEF DESCRIPTION OF DRAWINGS

The above and other objects, features and advantages of the present disclosure will become clearer from the following detailed description with reference to the accompanying drawings, in which.

DESCRIPTION OF EMBODIMENT

An embodiment of the present disclosure will be described below if of the drawings. In the present embodiment, a control system for an engine mounted on a vehicle is embodied. In the control system, an operation state, or the like, of an engine is controlled mainly with an electronic control unit (hereinafter, referred to as an ECU). An entire schematic diagram of the present system is illustrated in FIG. 1.

Figure 1:
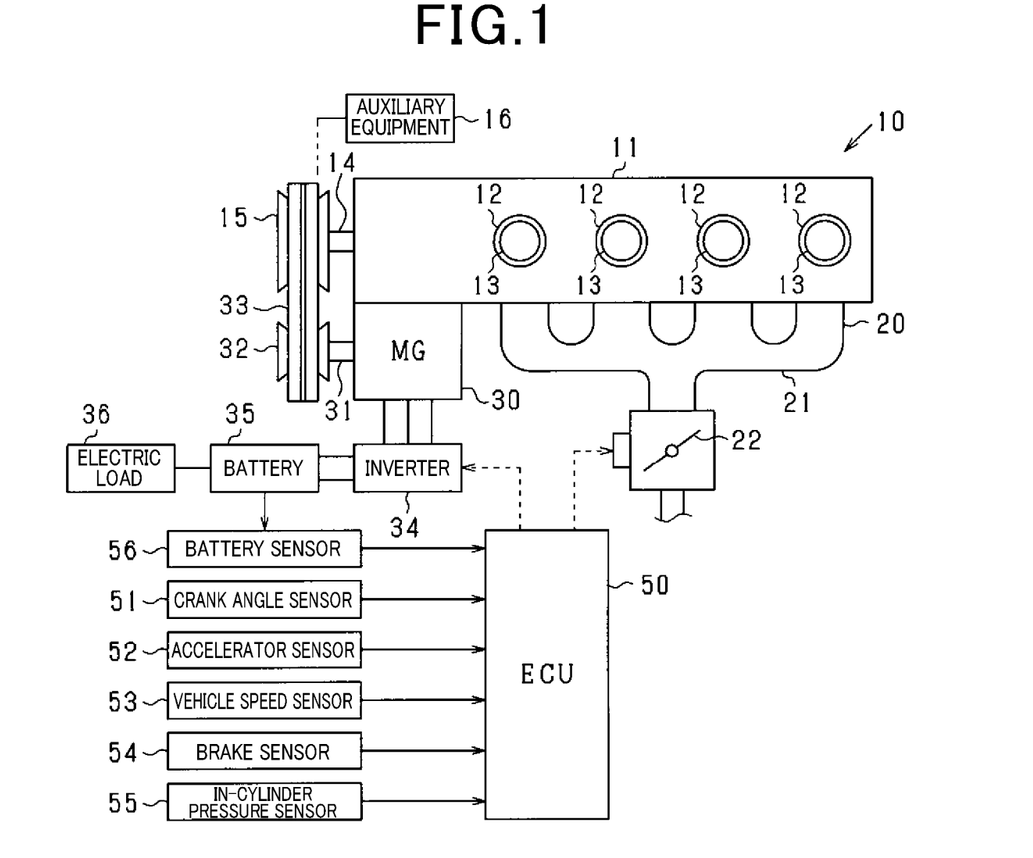
FIG. 1 is a schematic configuration diagram of an engine control system.

At a vehicle 10 illustrated in FIG. 1, an engine 11 is a four-stroke engine which is driven through combustion of a fuel such as gasoline, and which repeatedly performs respective types of process of intake, compression, expansion and exhaust. The engine 11 has four cylinders 12, and a piston 13 is held in each cylinder 12. Further, the engine 11 includes a fuel injection valve (not illustrated), an ignition device (not illustrated), or the like, as appropriate. Note that, while, in the present embodiment, an engine with four cylinders is illustrated, the engine may have any number of cylinders. Further, the engine 11 is not limited to a gasoline engine, and may be a diesel engine.

To the cylinder 12, air is supplied from an intake part 20. The intake part 20 includes an intake manifold 21, and a throttle valve 22 which adjusts an amount of air intake is provided upstream of the intake manifold 21.

In the engine 11, an MG (motor generator) 30 is integrally provided. The MG 30 is rotating electrical machine which is driven as an electric motor and a generator. A crank shaft (engine output shaft) 14 of the engine 11 is mechanically connected to a crank pulley 15, and a rotating shaft 31 of the MG 30 is mechanically connected to an MG pulley 32. Then, the crank pulley 15 is drive-coupled to the MG pulley 32 with a belt 33. Upon engine start, initial rotation (cranking rotation) is given to the engine 11 by rotation of the MG 30. Note that, it is also possible to employ a configuration where a starter motor is separately provided, and initial rotation is given to the engine 11 by rotation of the starter motor.

Further, the MG 30 is connected to a battery 35 via an inverter 34 which is a power conversion circuit. In the case where the MG 30 is driven as an electric motor, power is supplied to the MG 30 from the battery 35 via the inverter 34 by a command from the ECU 50. As a result, the MG 30 is driven. At the inverter 34, another ECU which controls the power conversion circuit of the inverter 34 in response to a command from the ECU 50 may be provided. Meanwhile, in the case where the MG 30 functions as a generator, after power generated at the MG 30 is converted from AC to DC at the inverter 34, the battery 35 is charged with the power. Note that electric loads 36 such as lamps and an audio device are connected to the battery 35.

In the vehicle 10, as auxiliary devices which are driven by rotation of the crank shaft 14, other than the MG 30, auxiliary equipment 16 such as a water pump, a fuel pump and a compressor of an air conditioner are mounted. Note that the auxiliary device includes a device whose coupled state with the crank shaft 14 is intermitted by clutch means, other than a device such as the auxiliary equipment 16 which is drive-coupled to the engine 11 with a belt, or the like.

The ECU 50, which is an electronic control apparatus including a microcomputer, or the like, configured with well-known CPU, ROM, RAM, or the like, performs various kinds of engine control such as opening control of the throttle valve 22 and control of fuel injection by the fuel injection valve if of detection results of various kinds of sensors provided in the present system.

For details of sensors, to the ECU 50, a crank angle sensor 51 which detects a rotational position of the crank shaft 14 and engine speed Ne, an accelerator sensor 52 which detects an operation amount of an accelerator (accelerator opening), a vehicle speed sensor 53 which detects vehicle speed, a brake sensor 54 which detects an operation amount of a brake pedal, an in-cylinder pressure sensor 55 which detects an in-cylinder pressure within a cylinder, and a battery sensor 56 which detects a battery state of the battery 35 are connected, and signals from these sensors are sequentially input to the ECU 50.

Examples of the crank angle sensor 51 can include electromagnetic pickup type rotational position detecting means, or the like, which outputs a rectangular detection signal (crank pulse signal) for each predetermined crank angle (for example, with a period of 10° CA). The engine speed Ne is calculated from a time period taken every time the crank shaft 14 rotates by 10° CA. Further, from the detection result of the rotational position, as well as the rotational position of the crank shaft 14 with respect to a predetermined reference position (for example, a compression top dead center) being calculated, process of the engine 11 is discerned.

The battery sensor 56 detects a voltage between terminals, a charge/discharge current, or the like, of the battery 35. If of these detection values, remaining capacity (SOC) of the battery 35 is calculated.

Further, the ECU 50 performs idling stop control of the engine 11. In the idling stop control, generally, combustion of the engine 11 is stopped when predetermined automatic stop conditions are fulfilled, and, thereafter, the engine 11 is restarted when predetermined restart conditions are fulfilled. In this case, the automatic stop conditions include, for example, a condition that vehicle speed of the own vehicle is within an engine automatic stop speed range (for example, vehicle speed ≤10 km/h) and accelerator operation is cancelled or brake operation is performed. Further, the restart conditions include, for example, a condition that accelerator operation is started, and a condition that brake operation is cancelled. Note that it is also possible to employ a configuration where an engine control function and an idling stop function are implemented at different ECUs 50.

Figure 2:
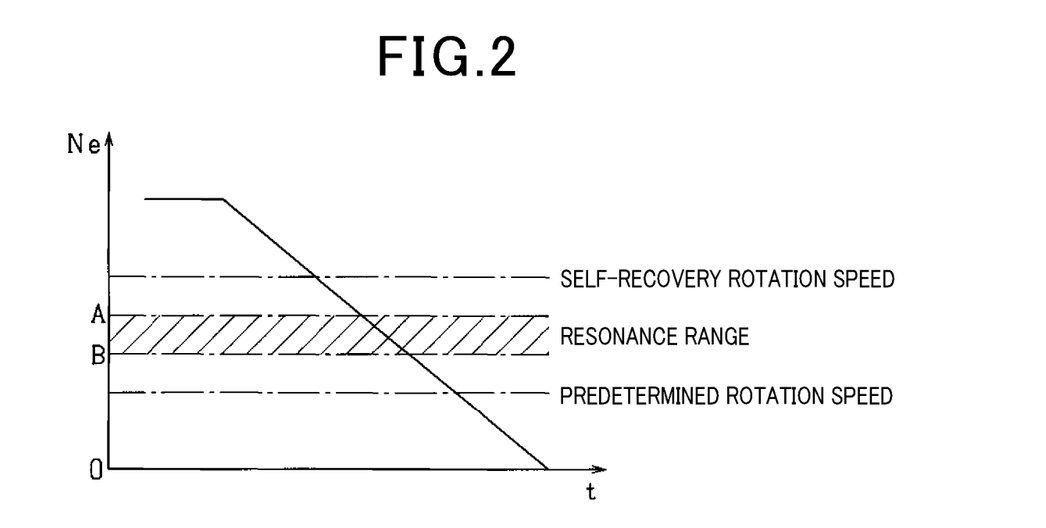
FIG. 2 is a transition chart of engine speed in a rotation drop period.

Here, at the vehicle 10, if the automatic stop conditions of the engine 11 are fulfilled from an idle state, combustion of the engine 11 is stopped. Thereafter, the engine speed Ne gradually decreases and becomes zero. FIG. 2 illustrates transition of the engine speed Ne in a rotation drop period until the engine speed Ne becomes zero after combustion of the engine 11 is stopped. In accordance with decrease in the engine speed Ne, the engine speed Ne passes through the self-recovery rotation speed, the resonance range of the engine, and predetermined rotation speed set in advance (for example, approximately 200 rpm). Here, the self-recovery rotation speed is a lower limit of rotation speed at which the engine can be restarted by supply of a fuel being resumed without cranking being performed while combustion of the engine 11 is stopped, and is, for example, set at approximately 500 rpm.

The resonance range of the engine refers to a range of the engine speed in which resonance occurs, and is, for example, set at 300 to 400 rpm. Here, resonance is a phenomenon that an excitation frequency corresponding to the engine speed is excited by matching with a resonance frequency of a power plant such as the engine body and an automatic transmission. By this phenomenon, vibration increases in the resonance range of the engine. In this manner, vibration in the resonance range is one factor of unpleasant vibration occurring when the engine is stopped.

Note that the resonance range of the engine is lower than an idle rotation speed and on a higher rotation side than cranking rotation speed of a conventional starter so as to minimize vibration occurring by resonance. Therefore, the engine speed Ne passes through the resonance range during the rotation drop period until the engine speed Ne reaches zero after combustion of the engine is stopped.

Meanwhile, also immediately before rotation of the engine is stopped, vibration occurs by swing-back (inverse rotation) of the engine. This vibration occurs by a piston being pushed back in a direction of a bottom dead center by compression reactive force within the cylinder when the engine is stopped. Note that vibration occurring in the resonance range negatively affects vibration of inverse rotation.

The present embodiment describes engine control in the rotation drop period until the engine speed Ne becomes zero after combustion of the engine 11 is stopped. Here, the rotation drop period is divided into three periods if of the engine speed Ne. That is, a period from when combustion of the engine 11 is stopped until when the engine speed Ne reaches an upper limit of the predetermined rotation speed range including the resonance range (specifically, a boundary value A on a higher rotation side of the resonance range) is set as a first period, a period during which the engine speed Ne is within the predetermined rotation speed range is set as a second period, and a period from when the engine speed Ne passes through a lower limit of the predetermined rotation speed range (specifically, a boundary value B on a lower rotation side of the resonance range) until when the engine speed Ne becomes zero is set as a third period. In the present embodiment, engine control is performed in accordance with respective periods.

In the first period, when the automatic stop conditions are fulfilled, and combustion of the engine 11 is stopped, an opening of the throttle valve 22 is made larger than that in the idle rotating state. By this means, an amount of air required to restart the engine is secured.

In the second period, rotation drop processing of increasing a rate of reduction of the engine speed Ne in the predetermined rotation speed range including the resonance range is performed. By this means, it is possible to shorten a time period during which the engine speed Ne passes through the resonance range, so that it is possible to suppress vibration occurring due to the resonance range.

Further, in the third period, torque on the inverse rotation side (counter torque) is applied to the crank shaft 14 so that the piston 13 is stopped at a crank rotational position in a first half of expansion process when rotation of the crank shaft 14 is stopped. By this means, inverse rotation of the engine is suppressed, so that it is possible to suppress vibration occurring due to the inverse rotation of the engine.

Figure 3:
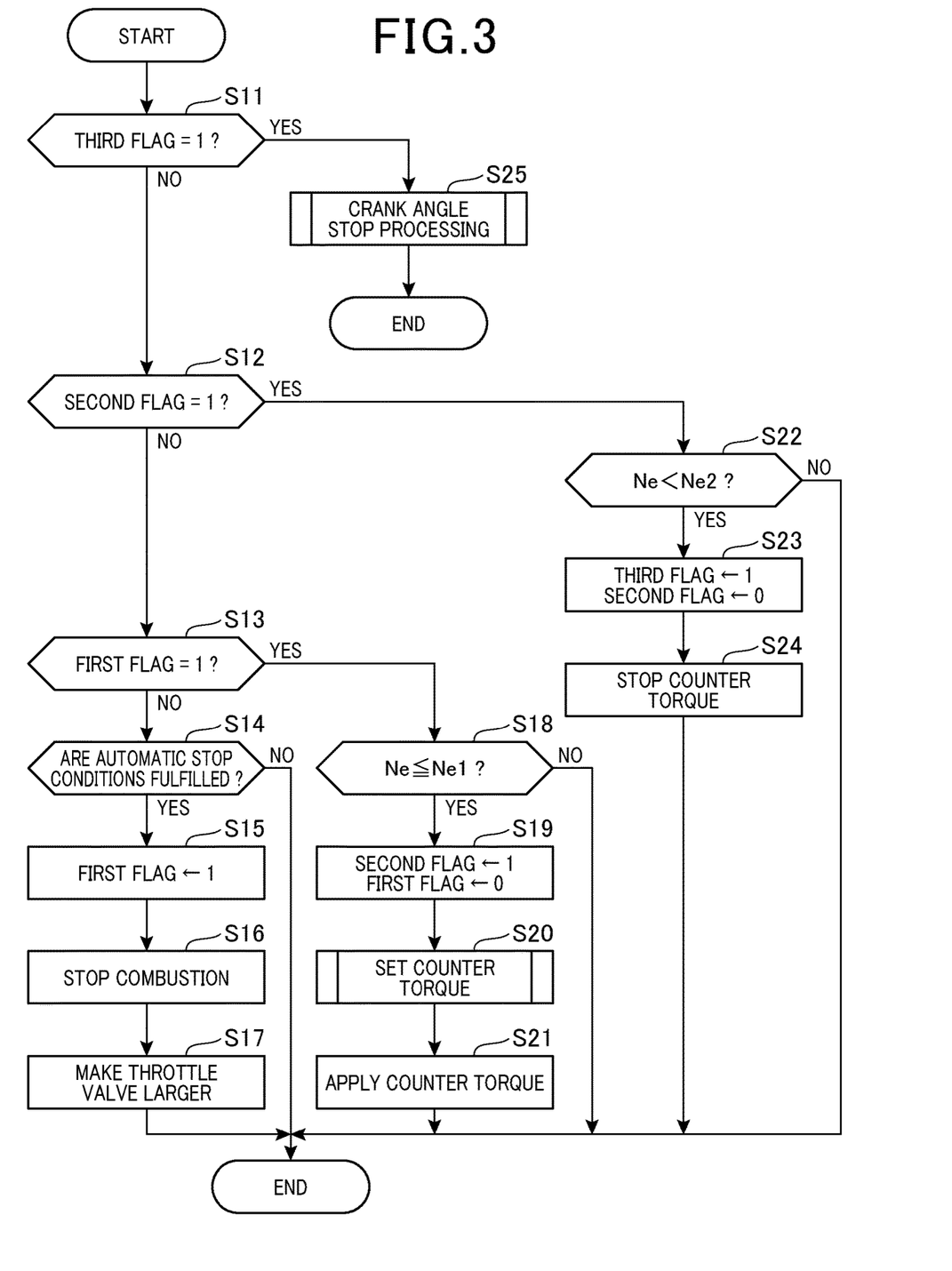
FIG. 3 is a flowchart illustrating processing of stopping engine speed.

FIG. 3 is a flowchart illustrating processing procedure concerning engine control, and the present processing is repeatedly executed with a predetermined period (for example, 10 ms) by the ECU 50.

First, flags will be described. A first flag, a second flag and a third flag in the drawing respectively correspond to the above-described first period, second period and third period, and indicate whether the engine speed Ne is within each period. Each flag indicates that the engine speed Ne is within the period in a case of 1, and indicates that the engine speed Ne does not fall within the period in a case of 0. Note that all the flags are set at 0 in initial setting.

In step S11, it is determined whether the third flag is 1. In step S12, it is determined whether the second flag is 1. In step S13, it is determined whether the first flag is 1. In the case where negative determination results are obtained in step S11 to step S13 in an initial state, the processing proceeds to step S14, and it is determined whether the engine automatic stop conditions are fulfilled. Then, in the case where a negative determination result is obtained in step S14, the present processing is finished without any processing being performed.

Meanwhile, in the case where it is determined in step S14 that the engine automatic stop conditions are fulfilled, the processing proceeds to step S15, and the first flag is set at 1. In the following step S16, combustion of the engine 11 is stopped, and the processing proceeds to step S17. In step S17, the opening of the throttle valve 22 is made larger than the opening in the idle rotating state (specifically, the opening is made larger than the opening in the idle rotating state by equal to or greater than 10%, and is, for example, made full opening), and the present processing is finished.

In this manner, control is performed so that the opening of the throttle valve 22 is made larger than the opening in the idle rotating state when combustion of the engine 11 is stopped. Note that the processing in step S17 corresponds to a throttle control unit.

Meanwhile, in the case where it is determined in step S13 that the first flag is 1, the processing proceeds to step S18, and it is determined whether the engine speed Ne is equal to or less than predetermined rotation speed Ne1 which is an upper limit of the predetermined rotation speed range. Note that, in the present embodiment, the boundary value A on the higher rotation side of the resonance range is set as the predetermined rotation speed Ne1. That is, in step S18, it is determined whether the engine speed Ne reaches the boundary value A on the higher rotation side of the resonance range.

In the case where it is determined in step S18 that the engine speed Ne is greater than the predetermined rotation speed Ne1, the present processing is finished without any processing being performed. Meanwhile, in the case where it is determined in step S18 that the engine speed Ne is equal to or less than the predetermined rotation speed Ne1, that is, in the case where the engine speed Ne transitions to the resonance range, the processing proceeds to step S19, and the second flag is set at 1, and the first flag is reset to 0.

If the engine speed Ne transitions to the resonance range, processing of increasing the rate of reduction of the engine speed Ne is executed. As the processing of increasing the rate of reduction, in the present embodiment, counter torque is applied using the MG 30 which is an auxiliary device. Then, in step S20, first, the counter torque is set.

The MG 30 has a power generation function as a generator and a power driving function as an electric motor, and application of counter torque is executed using the respective functions. Here, counter torque is greater in power driving than in regenerative power generation, and regenerative power generation excels in fuel consumption compared to power driving. Therefore, it is preferable to use each function in accordance with an operation state. In such a case, which function is used is judged if of various parameters. In the present embodiment, regenerative power generation or power driving of the MG 30 is selected in accordance with power consumption of the electric load 36 connected to the battery 35, a state of remaining capacity of the battery 35, demand torque required for application of counter torque, and a load by operation of the auxiliary equipment 16. Further, in this case, in the case where power consumption of the electric load 36 is large, or in the case where the load of the auxiliary equipment 16 is large, regenerative power generation is selected, and, in the case where the remaining capacity of the battery 35 is large, or in the case where the demand torque of the counter torque is large, power driving is selected.

Figure 4:
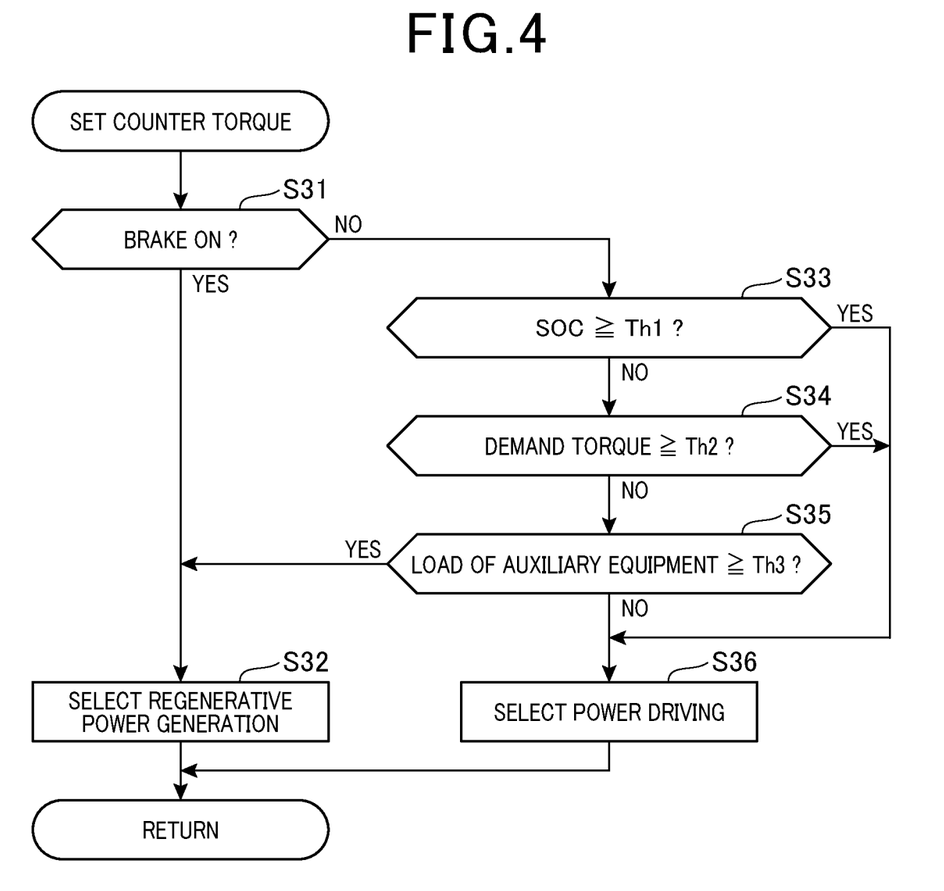
FIG. 4 is a flowchart of processing of setting counter torque.

FIG. 4 illustrates a flowchart of setting of the counter torque. First, in step S31, it is determined whether the power consumption of the electric load 36 is equal to or greater than a predetermined value. For example, examples of the electric load 36 can include, lamps, an electric pump, or the like. More specifically, it is determined whether a brake pedal is depressed. Because a brake lamp is lighted in a state where the brake pedal is depressed, power consumption becomes large. In the case where it is determined in step S31 that the brake pedal is depressed, the processing proceeds to step S32, and it is determined to apply counter torque through regenerative power generation. In this case, because power consumed by the electric load 36 is large, by utilizing regenerative power generation, it is possible to suppress vibration while reducing a burden on the battery 35.

Meanwhile, in the case where a negative determination result is obtained in step S31, the processing proceeds to step S33, and a function is selected in accordance with the remaining capacity of the battery 35. Here, for example, it is determined whether the SOC of the battery 35 is equal to or greater than a threshold Th1. In the case where it is determined in step S33 that the SOC is equal to or greater than the threshold Th1, the processing proceeds to step S36, and it is determined to apply counter torque through power driving. Note that a value of the threshold Th1 may be changed as appropriate, and, for example, may be a value from which it can be judged that the battery 35 is in a fully charged state in the case where the SOC is equal to or greater than the threshold Th1.

Here, in calculation of the SOC, an estimation method based on an open circuit voltage (OCV) and a calculation method through current integration are used. Here, an open circuit voltage of the battery 35 is acquired, the SOC is estimated using the acquired value and map indicating correspondence relationship between the open circuit voltage and the SOC, a charge/discharge current flowing through the battery 35 is acquired, and the SOC is calculated by performing calculation processing on the acquired value. Note that, in the case where counter torque is applied through power driving, greater counter torque may be set as the remaining capacity is greater. In this case, because it is possible to further shorten a time period during which the engine speed Ne passes through the resonance range, it can be considered that an effect of suppressing vibration is improved.

Meanwhile, in the case where a negative determination result is obtained in step S33, the processing proceeds to step S34, and a function is selected in accordance with the demand torque of the counter torque. For example, it is determined whether the demand torque is equal to or greater than a threshold Th2. In the case where it is determined in step S34 that the demand torque is equal to or greater than the threshold Th2, the processing proceeds to step S36, and it is determined to apply counter torque through power driving.

Further, in the case where a negative determination result is obtained in step S34, the processing proceeds to step S35, and a function is selected in accordance with the load of the auxiliary equipment 16. For example, it is determined whether the load by operation of the auxiliary equipment 16 is equal to or greater than a threshold Th3. In the case where it is determined in step S35 that the load is equal to or greater than the threshold Th3, the processing proceeds to step S32, and it is determined to apply counter torque through regenerative power generation. Note that, while, in such a case, power consumption of the electric load 36 is less than a predetermined value (step S31: No), regenerative power generation is selected in view of other parameters indicating an operation state of the vehicle.

Meanwhile, in the case where a negative determination result is obtained in step S35, the processing proceeds to step S36, and it is determined to apply counter torque through power driving. As described above, after regenerative power generation or power driving is determined if of the parameters, the processing transitions to step S21 in FIG. 3, and counter torque is applied. Note that it is also possible to employ a configuration where, in the case where a result in step S31 is No, the processing proceeds to step S36, and power driving is selected without determination from step S33 to step S35 being performed. That is, it is also possible to employ a configuration where, in the case where the power consumption of the electric load 36 is less than the predetermined value, counter torque is applied through power driving.

Here, application of counter torque through power driving corresponds to first rotation drop processing, and application of counter torque through regenerative power generation corresponds to second rotation drop processing.

Then, in the case where it is determined in step S12 in FIG. 3 that the second flag is 1, the processing proceeds to step S22, and it is determined whether the engine speed Ne is less than predetermined rotation speed Ne2 which is a lower limit of the predetermined rotation speed range. Note that, in the present embodiment, the boundary value B on the lower rotation side of the resonance range is set as the predetermined rotation speed Ne2. That is, in step S22, it is determined whether the engine speed Ne passes through the boundary value B on the lower rotation side of the resonance range.

In the case where it is determined in step S22 that the engine speed Ne is less than the predetermined rotation speed Ne2, that is, in the case where the engine speed Ne transitions to the third period, the processing proceeds to step S23, and the third flag is set at 1, and the second flag is reset to 0. In the following step S24, the counter torque applied in step S21 is stopped. Meanwhile, in the case where it is determined in step S22 that the engine speed Ne is equal to or greater than the predetermined rotation speed Ne2, the present processing is finished without any processing being performed.

Note that the processing in step S18 and step S22 corresponds to a resonance range determining unit which determines that the engine speed passes through the resonance range of the engine. Further, the processing in step S20 and step S21 corresponds to a rotation drop control unit. In this manner, in the present embodiment, in the case where it is determined that the engine speed passes through the resonance range, counter torque is applied to the engine output shaft using either power driving or regenerative power generation of the rotating electrical machine.

Figure 5:
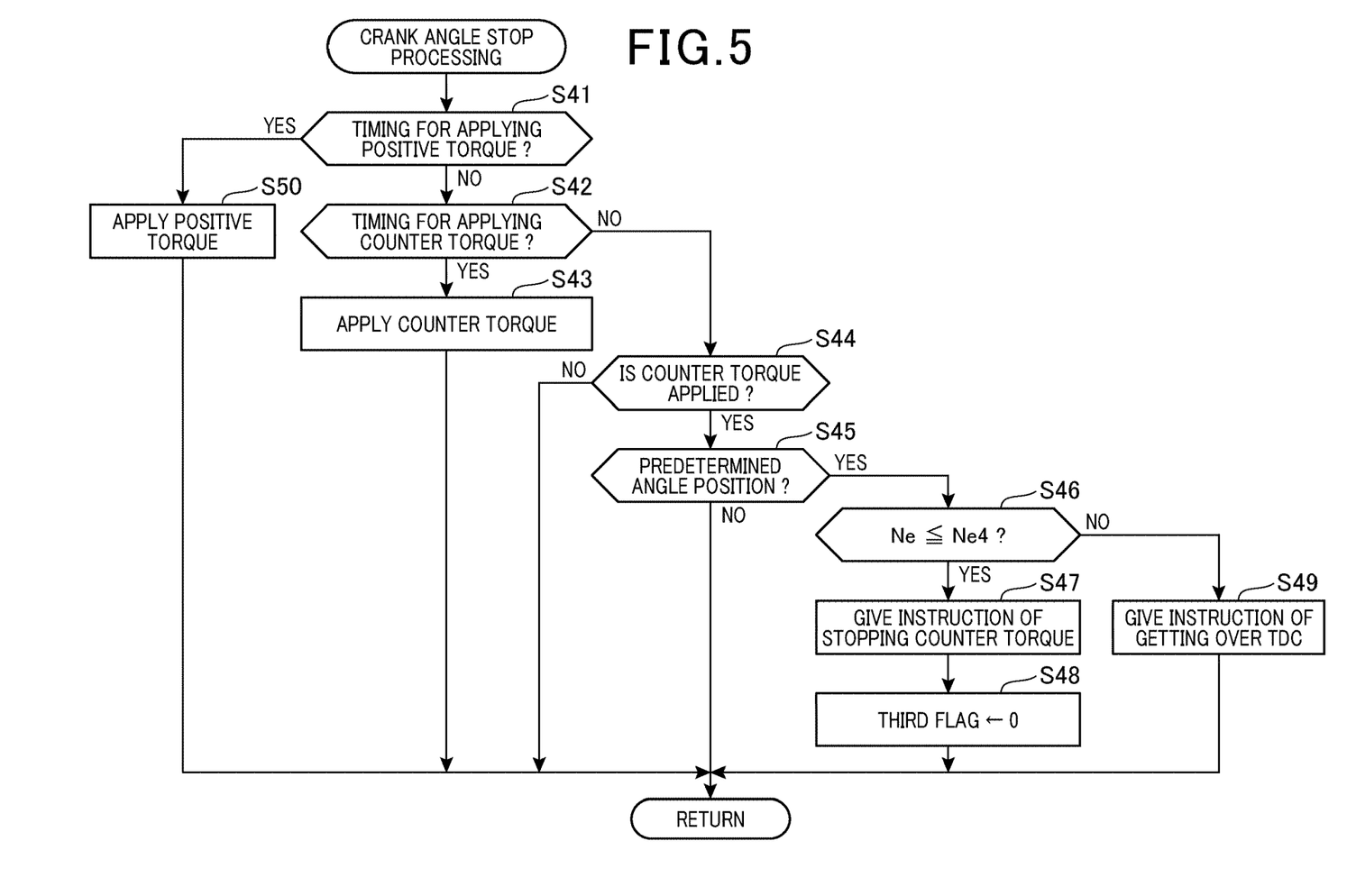
FIG. 5 is a flowchart of crank angle stop processing.

Then, in the case where it is determined in step S11 that the third flag is 1, the processing proceeds to step S25, and processing of subroutine illustrated in FIG. 5 is executed. That is, when the engine speed Ne transitions to the third period, crank angle stop processing for suppressing inverse rotation of the engine is performed. Here, counter torque is applied at a predetermined timing based on the engine speed so that the piston 13 is stopped at a position in a first half of expansion process, that is, the piston 13 of the next combustion cylinder is stopped at a position in a first half of compression process. Further, in the case where the piston 13 is not stopped at a desired position by application of counter torque, backup processing of applying torque on a positive rotation side (positive torque) to the engine output shaft is also executed. That is, in the crank angle stop processing, control is performed so that the piston 13 is not stopped at a position in a second half of compression process, that is, the piston 13 is not stopped at a position at which compression reactive force is generated.

In step S41 in FIG. 5, first, it is determined whether it is a timing for applying positive torque to the engine output shaft. In this step, an affirmative determination result is obtained in the case where it is determined to execute backup processing, and a negative determination result is obtained in step S41 in initial setting. In the following step S42, it is determined whether it is a timing for applying counter torque to the engine output shaft. In the present embodiment, for example, in the case where the engine speed Ne when the piston 13 is located at a compression TDC is equal to or less than predetermined rotation speed Ne3, it is determined that it is a timing for applying counter torque. Here, in the case where it is determined that it is a timing for applying counter torque, the processing proceeds to step S43, counter torque is applied to the engine output shaft, and the present processing is finished.

The predetermined rotation speed Ne3 is rotation speed at which it is determined that rotation of the engine output shaft is stopped until the piston passes through a first half period of the expansion process by counter torque being applied from a timing at which the piston is located at the compression TDC. Note that the predetermined rotation speed Ne3 is set as a value smaller than the predetermined rotation speed Ne2 which is the lower limit of the predetermined rotation speed range.

Meanwhile, in the case where it is determined in step S42 that it is not a timing for applying counter torque, the processing proceeds to step S44, and it is determined whether counter torque is applied. Here, in the case where a negative determination result is obtained in step S44, the present processing is finished without any processing being performed.

Meanwhile, in the case where it is determined in step S44 that counter torque is applied, the processing proceeds to step S45, and it is determined whether the crank rotational position detected by the crank angle sensor 51 is a set predetermined angle (for example, ATDC70° CA). In the case where it is determined that the rotational position is the predetermined angle, the processing proceeds to step S46, and it is determined whether the engine speed Ne is equal to or less than predetermined rotation speed Ne4. Meanwhile, in the case where a negative determination result is obtained in step S45, the present processing is finished without any processing being performed.

In the case where it is determined in step S46 that the engine speed Ne is equal to or less than the predetermined rotation speed Ne4, that is, in the case where it is determined that the piston 13 is stopped at a position in the first half of the expansion process, the processing proceeds to step S47, and an instruction of stopping the counter torque applied in step S43 is given. By this means, the counter torque applied to the engine output shaft is stopped. Subsequently, the processing proceeds to step S48, the third flag is reset to 0, and the present processing is finished.

Note that step S45 and step S46 correspond to a stop determining unit. The predetermined rotation speed Ne4 at the predetermined angle can be respectively arbitrarily changed, and only has to be a value from which it can be determined whether the piston 13 is actually stopped at the crank rotational position up to the first half of the expansion process after the counter torque is applied in step S43.

Meanwhile, in the case where it is determined in step S46 that the engine speed Ne is greater than the predetermined rotation speed Ne4, that is, in the case where it is determined that the piston 13 is not stopped at the position in the first half of the expansion process, the processing proceeds to step S49, and an instruction for allowing the piston 13 to get over the next compression TDC is given. That is, it is judged to execute backup processing. Then, in the present embodiment, in the case where this processing is executed, and the crank rotational position is located at the predetermined rotation angle (for example, ATDC90° CA), it is determined that it is a timing for applying positive torque to the engine output shaft (step S41: Yes).

If an affirmative determination result is obtained in step S41, the processing proceeds to step S50, positive torque is applied, and the present processing is finished. Thereafter, the processing proceeds to step S42 again, and the crank angle stop processing is executed until the third flag is finally reset to 0.

Figure 6:
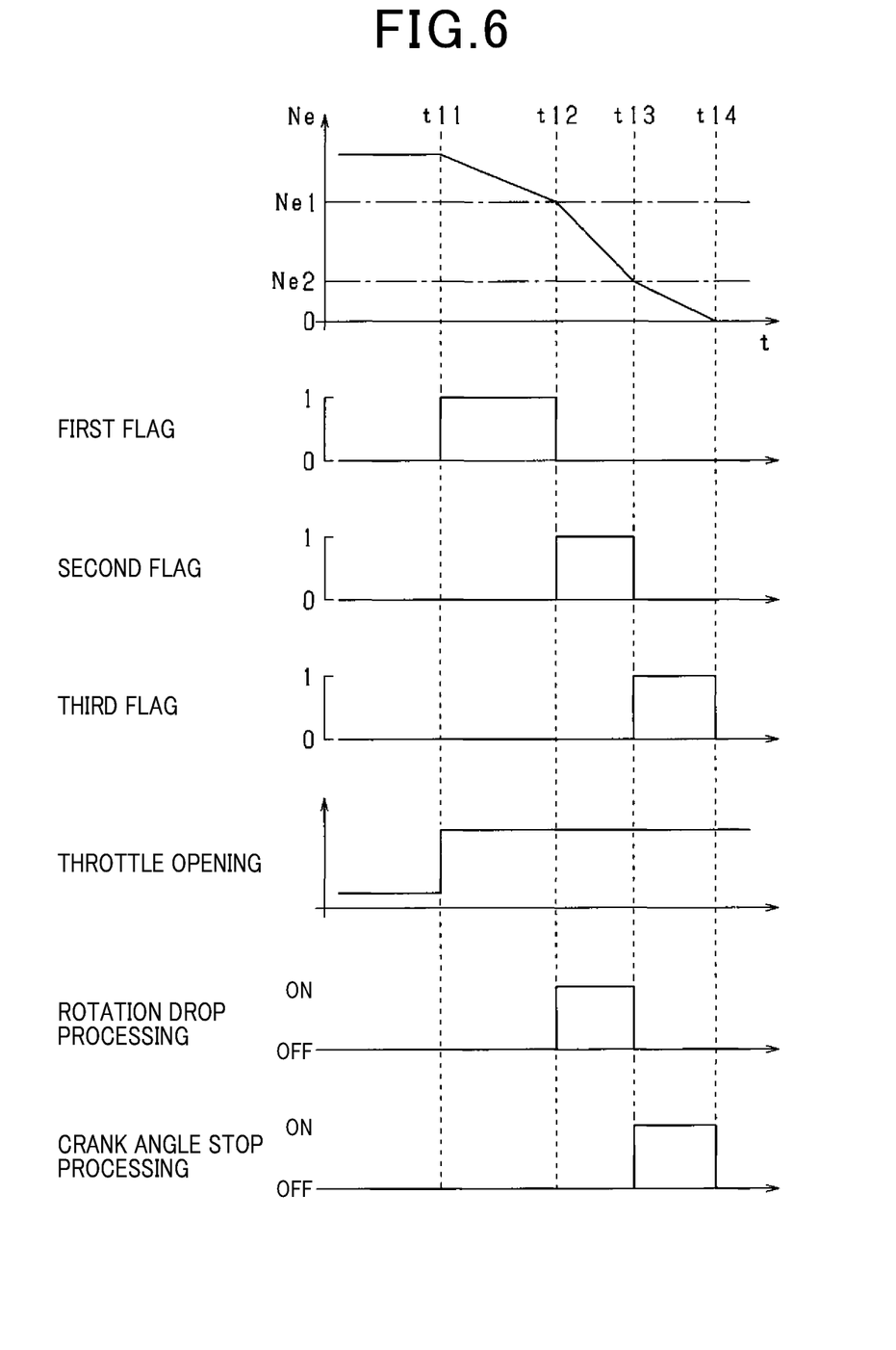
FIG. 6 is a timing chart illustrating aspect of the processing of stopping engine speed.

Engine control in the rotation drop period until the engine speed Ne completely becomes zero after combustion of the engine 11 is stopped will be described next using a timing chart in FIG. 6.

First, if the automatic stop conditions are fulfilled at a timing t11 from the idle state, the first flag is set at 1. At this time, the opening of the throttle valve 22 is controlled to be larger than the opening in the idle state. Thereafter, if the engine speed Ne becomes equal to or less than the predetermined rotation speed Ne1 at a timing t12, at the same time as the second flag being set at 1, the first flag is reset to 0. At this time, counter torque is applied to the engine output shaft as rotation drop processing. Then, if the engine speed Ne is below the predetermined rotation speed Ne2 at a timing t13, at the same time as the third flag being set at 1, the second flag is reset to 0. At this time, the rotation drop processing is stopped, and in the following third period, the crank angle stop processing is executed. Then, the engine speed Ne becomes zero at a timing t14.

Figure 7:
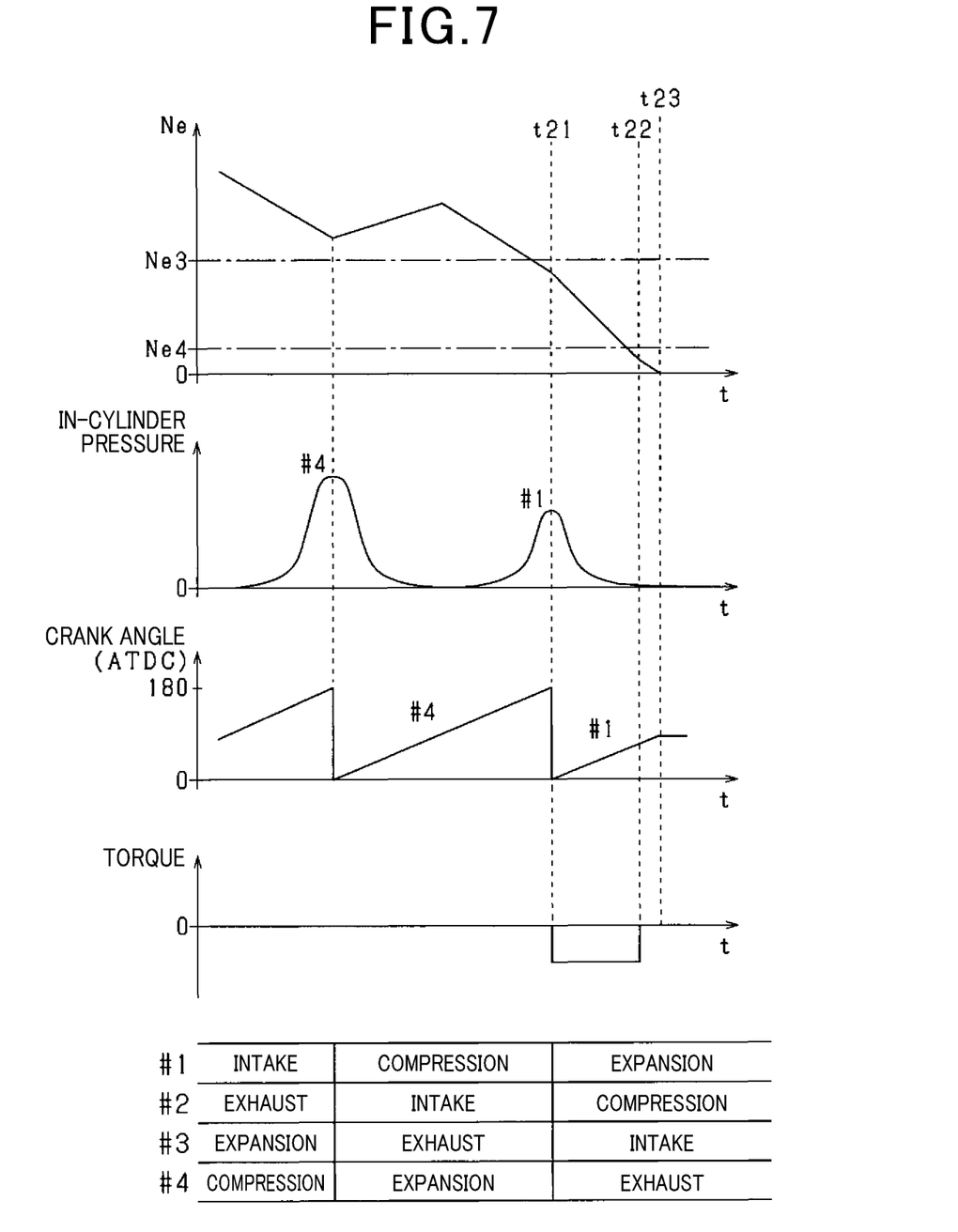
FIG. 7 is a timing chart illustrating aspect of the crank angle stop processing.
Figure 8:
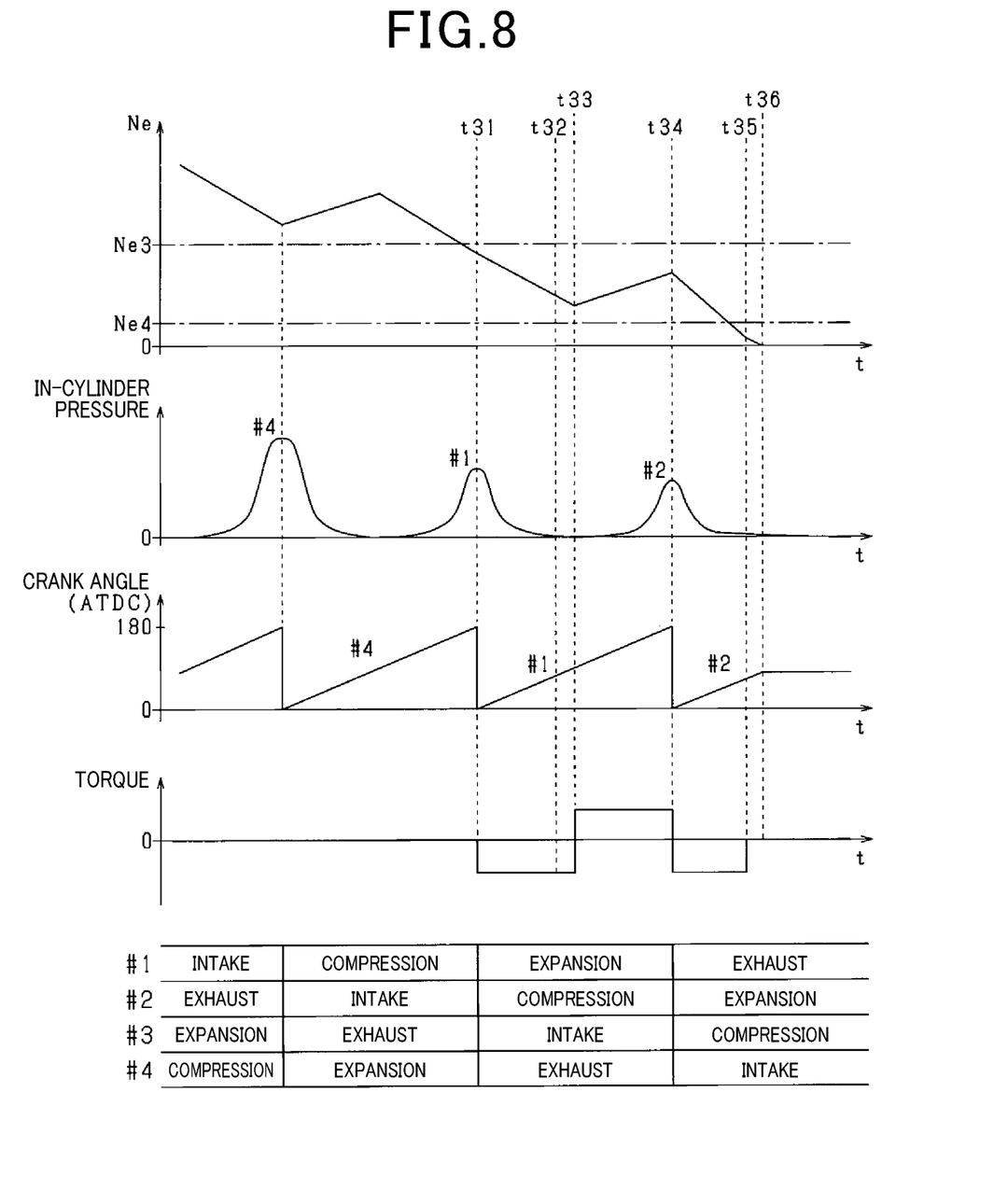
FIG. 8 is a timing chart illustrating aspect of the crank angle stop processing.

Subsequently, the crank angle stop processing in the case where the engine speed Ne is within the third period will be described using timing charts in FIG. 7 and FIG. 8. These respectively illustrate cases of different determination results in step S46 in FIG. 5 after counter torque is applied. FIG. 7 illustrates a case where an affirmative determination result is obtained in step S46, and only counter torque is applied in the third period, while FIG. 8 illustrates a case where a negative determination result is obtained in step S46, and, in addition to counter torque, positive torque is also applied in the third period. Note that these drawings illustrate change of an in-cylinder pressure of each cylinder. The in-cylinder pressure increases as the piston 13 comes closer to the compression TDC, and becomes a maximum at the compression TDC. Further, a local maximum value of the in-cylinder pressure decreases as the engine speed Ne decreases. Note that firing order of the respective cylinders is #1, #2, #3 and #4 for the purpose of illustration.

In FIG. 7, while the engine speed Ne drops, when the engine speed Ne becomes equal to or less than Ne3 at a timing t21 (at a timing at which a first cylinder (#1) reaches the compression TDC), counter torque is applied to the engine output shaft, which leads to increase in rate of reduction of the engine speed Ne, and the engine speed Ne approaches zero. Then, when the engine speed Ne at a timing t22 (at a timing at which the first cylinder (#1) reaches a predetermined crank angle position (for example, ATDC70° CA)) becomes equal to or less than the predetermined rotation speed Ne4, application of the counter torque is stopped. Thereafter, rotation of the engine 11 is stopped at a timing t23. At this time, the piston 13 of the first cylinder (#1) is stopped at a position in the first half of the expansion process (for example, ATDC80° CA).

In FIG. 8, when the engine speed Ne becomes equal to or less than Ne3 at a timing t31 (at a timing at which the first cylinder (#1) reaches the compression TDC), counter torque is applied. Then, when the engine speed Ne at a timing t32 (at a timing at which the first cylinder (#1) reaches a predetermined crank angle position (for example, ATDC70° CA)) is greater than the predetermined rotation speed Ne4, backup processing is executed. That is, at a timing t33, positive torque is applied so that the second cylinder (#2) can get over the next compression TDC. Here, the timing t33 is set at a timing at which the first cylinder (#1) is located at a predetermined crank angle position (for example, ATDC90° CA).

Then, when the engine speed Ne becomes equal to or less than the predetermined rotation speed Ne3 again at a timing t34 at which the second cylinder (#2) reaches the compression TDC, counter torque is applied again. Thereafter, when the engine speed Ne at a timing t35 (at a timing at which the second cylinder (#2) reaches a predetermined crank angle position (for example, ATDC70° CA)) becomes equal to or less than the predetermined rotation speed Ne4, application of the counter torque is stopped. Then, rotation of the engine 11 is stopped at a timing t36, and at that time, the second cylinder (#2) is stopped at a position in the first half of the expansion process (for example, ATDC80° CA).

In the present embodiment, a four-cylinder engine is described as a multi-cylinder engine. In such a case, when the piston 13 in one cylinder is stopped at a position in the first half period of the expansion process, the pistons 13 in other cylinders are not stopped at a position in the second half period of the compression process, that is, at a position at which compression reactive force is generated.

According to the present embodiment described in detail above, it is possible to obtain the following excellent effects.

In a vehicle having an idling stop function, when combustion of the engine 11 is stopped, by making the opening of the throttle valve 22 larger than the opening in the idle rotating state, it is possible to secure a sufficient amount of air required upon restart of the engine. Further, by applying counter torque using the MG 30 so that rate of reduction of the engine speed is increased in the resonance range, it is possible to shorten a time period during which the engine speed passes through the resonance range. In this case, while there is concern that vibration is increased in the resonance range in a state where the throttle opening is large, by shortening the time period during which the engine speed passes through the resonance range, it is possible to suppress increase in vibration. By this means, in a vehicle having an idling stop function, it is possible to secure startability upon restart while suppressing occurrence of vibration when the engine is automatically stopped.

A configuration is employed where the opening of the throttle valve 22 is made larger than the opening in the idle rotating state at a time point at which combustion of the engine 11 is stopped. By this means, even in the case where restart conditions are fulfilled immediately after combustion is stopped, it is possible to secure a sufficient amount of air, so that startability upon restart becomes favorable.

A configuration is employed where, in the resonance range, counter torque is applied using the MG 30. In this case, it is possible to apply greater counter torque to the engine output shaft compared to torque applied using the auxiliary equipment 16. Therefore, a time period during which the engine speed passes through the resonance range is further shortened, so that an effect of suppressing vibration is improved.

Further, a configuration is employed where, in application of counter torque using the MG 30, regenerative power generation or power driving can be selected. Here, counter torque is greater in power driving than in regenerative power generation, and regenerative power generation excels in fuel consumption compared to power driving. By this means, it is possible to select a drive system while obtaining respective advantages of regenerative power generation and power driving in accordance with an operation state.

A configuration is employed where, concerning selection of the drive system of the MG 30, regenerative power generation or power driving can be selected in accordance with power consumption of the electric load 36 connected to the battery 35. In this case, in the case where power consumption of the electric load 36 is equal to or greater than a predetermined value, because the battery 35 is under a heavy load, counter torque is applied through regenerative power generation. By this means, it is possible to suppress vibration while maintaining a stable power state of the battery 35.

Specifically, a configuration is employed where, in a case of a state where a brake pedal is depressed, counter torque is applied while regenerative power generation is selected. In a state where the brake pedal is depressed, power consumption of the battery 35 increases in association with lighting of a brake lamp. Therefore, it is possible to suppress vibration while maintaining a stable power state of the battery 35.

Concerning selection of the drive system of the MG 30, further, a configuration is employed where regenerative power generation or power driving can be selected if of the remaining capacity of the battery 35. In this case, in the case where the remaining capacity is equal to or greater than the threshold Th1, counter torque is applied through power driving. In the case where there is large remaining capacity of the battery 35, there is a concern that the battery 35 is overcharged by the rotating electrical machine being caused to perform regenerative power generation. Concerning this point, by counter torque being applied through power driving, it is possible to suppress vibration occurring due to the resonance range without damaging the battery 35.

In the case where it is determined that the cylinder is located at a compression top dead center immediately before the engine speed becomes zero in the third period, counter torque is applied from the compression top dead center using the MG 30. In this case, by applying counter torque, it is possible to stop the piston 13 at a position in the first half of the expansion process. By this means, by suppressing occurrence of inverse rotation of the engine, it is possible to reduce vibration in association with the inverse rotation of the engine.

Specifically, it is determined that the cylinder is located at the last compression top dead center if that the engine speed at the compression top dead center of the engine 11 is equal to or less than a predetermined value. Here, the predetermined value is a value from which it is determined that the piston 13 is stopped at the position in the first half of the expansion process by application of the counter torque. Therefore, it is possible to stop the piston 13 at a desired position, so that it is possible to reduce vibration in association with the inverse rotation of the engine.

Further, a configuration is employed where a stop determining unit is provided which determines whether the piston 13 is actually stopped at a desired position after the counter torque is applied, and, in the case where it is determined that the piston 13 is stopped at the desired position, application of the counter torque is stopped. In this case, when rotation of the engine is stopped at a position in the first half of the expansion process, application of the counter torque is cancelled. By this means, it is possible to prevent inverse rotation of the engine due to counter torque.

Further, backup processing is provided in stop control in the third period. That is, in the case where it is determined by the stop determining unit that the piston 13 is not stopped at a desired position, positive torque is applied once so that the piston 13 can get over the next compression TDC. Then, when the cylinder reaches the compression TDC, processing of applying counter torque again from that point, and stopping the piston at the position in the first half of the expansion process is performed. By this means, it is possible to stop the piston 13 at the position in the first half of the expansion process more reliably, so that it is possible to improve an effect of suppressing vibration.

After combustion of the engine 11 is stopped, in the rotation drop period until the engine speed drops to zero, counter torque is applied in the resonance range, and counter torque by crank stop processing or positive/counter torque is applied in the third period, using the MG 30. By this means, it is possible to suppress also vibration related to the inverse rotation of the engine as well as vibration in the resonance range. Further, in this case, it is possible to reduce a negative effect of vibration in the resonance range on vibration due to the inverse rotation. In this manner, by combining application of counter torque in the resonance range and processing in the third period, it is possible to synergistically suppress vibration occurring from when combustion of the engine 11 is stopped until when rotation of the engine 11 is stopped.

The present disclosure is not limited to the above-described embodiment, and, for example, may be implemented as follows.

While, in the above-described embodiment, a configuration is employed where counter torque is applied using the MG 30 as the auxiliary device, any auxiliary device which can apply counter torque to the engine output shaft may be used. Examples of the auxiliary device can include, for example, the auxiliary equipment 16 such as a water pump and a fuel pump. In this case, also in a vehicle on which the MG 30 is not mounted, it is possible to apply counter torque using a device which is normally provided at the vehicle. Therefore, it is not necessary to separately provide a new device, and is economical.

In the above-described embodiment, counter torque is applied in the second period assuming that the predetermined rotation speed range is the resonance range. That is, an upper limit of the predetermined rotation speed range is set as the boundary value A on the higher rotation side of the resonance range, and a lower limit of the predetermined rotation speed range is set as the boundary value B on the lower rotation side of the resonance range. Concerning this point, any configuration may be employed if the predetermined rotation speed range is set so as to include the resonance range.

For example, it is also possible to employ a configuration where the predetermined rotation speed range is determined while setting the predetermined rotation speed on the higher rotation side of the resonance range as the upper limit. In this case, it is determined in step S18 in FIG. 3 whether the engine speed Ne is equal to or less than the predetermined rotation speed Ne1 set on the higher rotation side of the boundary value A of the resonance range, and if a determination result in step S18 is Yes, application of counter torque is started. According to this configuration, after combustion of the engine 11 is stopped, by counter torque being applied before the engine speed reaches the resonance range, it is possible to improve response to rate of reduction by the counter torque near the boundary value A of the resonance range. As a result, a time period during which the engine speed passes through the resonance range is further shortened, so that an effect of suppressing vibration is improved.

Further, it is also possible to employ a configuration where the predetermined rotation speed range is determined while setting the self-recovery rotation speed on the higher rotation side of the resonance range as the upper limit. In this case, it is determined in step S18 in FIG. 3 whether the engine speed Ne is equal to or less than the predetermined rotation speed Ne1 set at the self-recovery rotation speed, and in the case where a determination result in step S18 is Yes, application of counter torque is started. According to this configuration, in a state where the engine speed exceeds the predetermined rotation speed Ne1 which is an early stage in which the engine speed starts to drop in association with stop of combustion of the engine, it is possible to expect a possibility that the engine is autonomously recovered without the rate of reduction of the engine speed being increased. As a result, it is possible to improve response to the rate of reduction in the resonance range and improve an effect of suppressing vibration while reducing power consumption required for restart.

Other than the above configurations, it is also possible to employ a configuration where the predetermined rotation speed range is determined while setting the predetermined rotation speed set in advance on the lower rotation side of the resonance range as the lower limit. In this case, it is determined in step S22 in FIG. 3 whether the engine speed Ne is less than the predetermined rotation speed Ne2 set in advance, and in the case where a determination result in step S22 is Yes, application of the counter torque is stopped. According to this configuration, it is possible to expect a possibility that the engine is restarted by cranking without the rate of reduction of the engine speed being increased during a period while the engine speed is within a range between the predetermined rotation speed set in advance and zero. As a result, it is possible to secure startability of restart while suppressing vibration in the resonance range.

Further, it is also possible to set the predetermined rotation speed range by combining settings of the above-described upper limit and lower limit of the predetermined rotation speed range. For example, it is possible to set the upper limit of the predetermined rotation speed range as the self-recovery rotation speed on the higher rotation side of the resonance range and set the lower limit as the predetermined rotation speed set in advance on the lower rotation side of the resonance range. In such a case, it is possible to make the engine speed promptly pass through the rotation speed range in which the engine cannot be restarted by means of fuel supply or cranking. Meanwhile, in a range in which the engine can be restarted, rate of reduction of the engine speed is not increased. As a result, it is possible to secure startability of restart while suppressing vibration in the resonance range.

While, in the above-described embodiment, a configuration is employed where, concerning application of counter torque in the resonance range, regenerative power generation or power driving of the MG 30 is selected in accordance with power consumption of the electric load 36 connected to the battery 35, the state of the remaining capacity of the battery 35, the demand torque required for application of counter torque, and the load by operation of the auxiliary equipment 16, it is also possible to employ a configuration where regenerative power generation or power driving is selected in accordance with other parameters. Examples of other parameters can include rotation speed, or the like, of the MG 30.

Note that, in selection of the drive system of the MG 30, priority may be set on the above-described parameters. For example, determination based on a driving state of the electric load 36 can be used as the top priority, and, subsequently, an order of priority can be set in order of the state of the remaining capacity of the battery 35, the demand torque required for application of counter torque, and the load by operation of the auxiliary equipment 16.

While, in the above-described embodiment, the SOC of the battery 35 is used as the state of the remaining capacity of the battery 35, the state of the remaining capacity of the battery 35 is not limited to this, and, for example, a voltage between the terminals of the battery 35 may be used.

In the above-described embodiment, a configuration is employed where, in the case where it is determined that the power consumption of the electric load 36 is equal to or greater than a predetermined value, specifically, in the case where the brake pedal is depressed, counter torque is applied through regenerative power generation. Concerning this point, it is, for example, also possible to employ a configuration where, in the case where it is determined that the power consumption of the electric load 36 is less than a predetermined value, specifically, in the case where the brake pedal is not depressed, counter torque is applied through power driving. In this case, because power consumption by the electric load 36 is small, it is possible to suppress a total amount of power even if power driving is performed. Further, by utilizing power driving, it is possible to make the engine speed pass through the resonance range in a shorter time period. By this means, it is possible to effectively suppress vibration.

Concerning the backup processing in the third period, while, in FIG. 8, a configuration is employed where counter torque is applied in a period from the timing t31 to the timing t33, it is also possible to employ a configuration where counter torque is stopped at a time point at which stop is determined at the timing t32.

Further, in FIG. 8, a configuration is employed where positive torque is applied in a period from the timing t33 to the timing t34 (a timing at which the second cylinder (#2) reaches the compression TDC). Concerning this point, a period during which positive torque is applied is not limited to this, and it is only necessary to employ a configuration where positive torque is applied so that the piston (here, the second cylinder (#2)) can get over the compression TDC, and it is also possible to employ a configuration where application of the positive torque is stopped before the compression TDC.

A magnitude of the counter torque applied in the crank angle stop processing only has to be determined in advance as torque required for stopping the piston 13 at the position in the first half of the expansion process. Further, it is also possible to provide means for predicting a stop position of the piston 13 every moment when rotation of the engine is stopped, and apply counter torque while performing feedback control of adjusting torque if of the predicted stop position.

Magnitudes of the counter torque and the positive torque applied in the crank angle stop processing may be changed as appropriate, and may be the same or different from each other. Further, magnitudes of first counter torque and second counter torque in the case where backup processing is performed may be changed as appropriate. For example, the second counter torque may be set greater than the first counter torque, and according to this configuration, it can be considered that the piston can be stopped at a desired position more reliably.

In the above-described embodiment, in the crank angle stop processing, a timing for applying counter torque is judged in accordance with whether the engine speed Ne at the compression TDC falls below the predetermined rotation speed Ne3. Concerning this point, the crank angle position at which the predetermined rotation speed Ne3 is set is not limited to the compression TDC, and judging may be performed with the engine speed Ne at other crank angle positions being set as the threshold. Note that, in this case, it is also possible to employ a configuration where application of counter torque is started from the crank angle position at which the threshold is set.

While, in the above-described embodiment, in the crank angle stop processing, the predetermined rotation speed Ne3 is provided as the threshold for the engine speed to judge a timing for applying counter torque, the judging method is not limited to this method. For example, it is also possible to use a method of judging a timing from transition of drop of the engine speed Ne. In this case, the ECU 50, for example, calculates a rotation speed drop amount ΔNe from the engine speed Ne for each compression TDC and estimates a compression TDC (i) at which it is predicted that the engine speed Ne falls below zero. Then, it is possible to set at timing at which the piston 13 reaches a compression TDC (i−1) immediately before the compression TDC (i) as a timing for applying counter torque.

The above-described control in the rotation drop period until the engine speed becomes zero may be performed in a case of stop by ignition switch operation by a driver as well as in a case of automatic stop of the engine. Further, the above-described control may be also performed in a case of stop in a vehicle which does not have an idling stop function.

While the present disclosure has been described with reference to the examples, the present disclosure is not limited to the examples and structures. The present disclosure incorporates various modified examples and modifications within an equivalent range. In addition, various combinations, forms, and other combinations and forms including only one element or more or less elements fall within the scope and the conceptual range of the present disclosure.

What is claimed is:

1. An engine control apparatus which is applied to an engine system including rotating electrical machine which is capable of applying positive torque which is torque on a positive rotation side and counter torque which is torque on an inverse rotation side to an engine output shaft of an engine in which a cycle including each process of compression and expansion is repeatedly performed, the engine control apparatus comprising:
    a rotation speed determining unit configured to determine that a piston is at a compression top dead center immediately before engine speed becomes zero if the engine speed at the compression top dead center of the engine during a rotation drop period while the engine speed drops to zero after combustion of the engine is stopped; and
    a torque control unit configured to, in a case where it is determined that the piston is at the compression top dead center immediately before the engine speed becomes zero, apply counter torque by the rotating electrical machine from the compression top dead center to stop the piston at a rotation angle position in a first half period of an expansion process by application of the counter torque.

2. The engine control apparatus according to claim 1, wherein the rotation speed determining unit determines that the piston is at the compression top dead center immediately before the engine speed becomes zero if the engine speed at the compression top dead center of the engine is equal to or less than a predetermined value, and
    the predetermined value is a value with which it is determined that rotation of the engine output shaft is stopped until the first half period of the expansion process elapses by application of the counter torque by the rotating electrical machine from the compression top dead center.

3. The engine control apparatus according to a claim 2, wherein the engine is a four-cylinder engine.

4. The engine control apparatus according to claim 1, further comprising:
    a stop determining unit configured to determine whether the piston is stopped at the rotation angle position in the first half period of the expansion process after the counter torque is applied by the rotating electrical machine,
    wherein the torque control unit stops application of the counter torque if it is determined that the piston is stopped at the rotation angle position in the first half period of the expansion process after application of the counter torque, and
    in a case where it is determined by the stop determining unit that the piston is not stopped at the rotation angle position in the first half period of the expansion process, the torque control unit applies positive torque by the rotating electrical machine so that the piston gets over a next compression top dead center.

5. The engine control apparatus according to claim 4, wherein the engine is a four-cylinder engine.

6. The engine control apparatus according to claim 1, further comprising:
    a resonance range determining unit configured to determine that the engine speed is within a predetermined rotation speed range including at least a resonance range of the engine in the rotation drop period,
    wherein the torque control unit applies counter torque by the rotating electrical machine in a case where it is determined that the engine speed is within the predetermined rotation speed range prior to application of the counter torque.

7. The engine control apparatus according to a claim 1, wherein the engine is a four-cylinder engine.

* * * * *